No. 764,863. PATENTED JULY 12, 1904.
W. B. D. PENNIMAN.
PROCESS OF EXTRACTING RESINOUS MATTER FROM LONG LEAF OR PITCH PINE.
APPLICATION FILED FEB. 13, 1903.
NO MODEL.
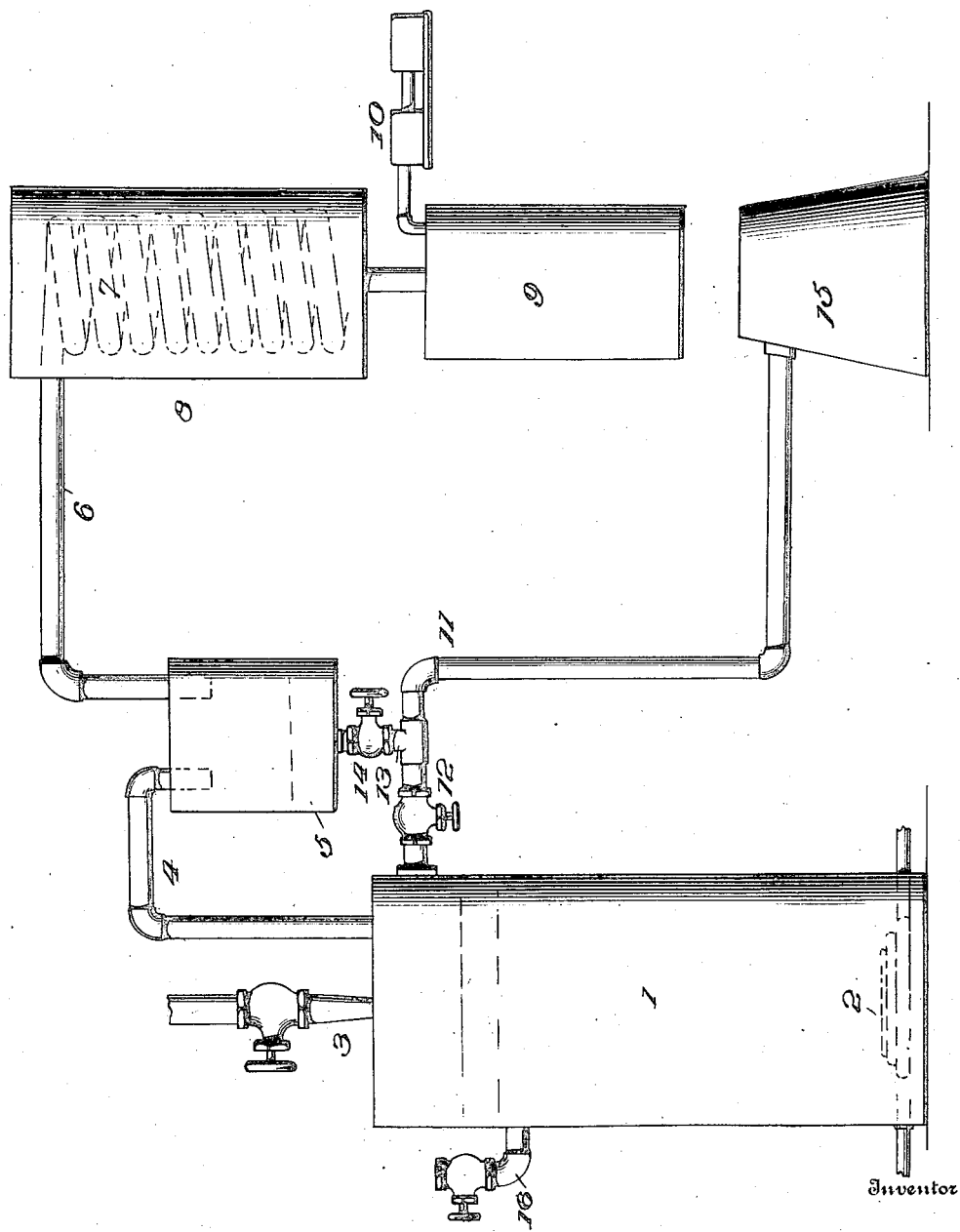

No. 764,863. Patented July 12, 1904.

UNITED STATES PATENT OFFICE.

WILLIAM B. D. PENNIMAN, OF BALTIMORE, MARYLAND.

PROCESS OF EXTRACTING RESINOUS MATTER FROM LONG-LEAF OR PITCH PINE.

SPECIFICATION forming part of Letters Patent No. 764,863, dated July 12, 1904.

Application filed February 13, 1903. Serial No. 143,258. (No specimens.)

*To all whom it may concern:*

Be it known that I, WILLIAM B. D. PENNIMAN, a citizen of the United States of America, and a resident of 13 North street, Baltimore, Maryland, have invented certain new and useful Improvements in Processes of Extracting Resinous Matter from Long-Leaf or Pitch Pine, of which the following is a specification.

My invention relates to a process for the extraction of resinous matter from long-leaf or pitch pine. It may be used, however, for any other purpose for which it may be found to be practicable.

Heretofore attempts have been made to obtain rosins and essential oils from finely-divided wood by piling the wood in water and then distilling the fluid to drive off the turpentine and other volatile materials. This method has a serious defect, however. Pure rosin has a greater specific gravity than water; but rosin mixed with turpentine has a less specific gravity than water, and the mixture will float until the turpentine is eliminated; then the rosin will sink to the bottom of the tank, become mixed with the wood in an inseparable union, and be lost. It has also been customary in the past to heat wood in various ways, either by direct radiation or by heating the air in contact with it, and then subjecting the heated wood to a partial vacuum; but none of these methods have resulted in a satisfactory elimination of rosin.

My method consists in subjecting wood in a closed retort to the action of hot water, and then while the wood is so heated and submerged in water the space above the water in the retort is partially or wholly vacuated. This relief of atmospheric pressure upon the surface of the water in the closed receptacle causes the expansion of the air and gases contained in the water as well as in the wood. The expansion of contained gases and air in the wood causes the expulsion of the rosin, turpentine, and oils from the pores of the wood, which at once rise to the surface of the water and are mixed together. The reduction of atmospheric pressure above the water in the tank will cause an expansion of gases and an evaporation of fluid, which will cause a reduction of temperature at the surface of the fluid sufficiently to prevent the evaporation of the turpentine, which will remain mixed with the rosin floating upon the surface of the water. The wood relieved of its contained air will sink and remain at the bottom of the tank. The resinous matter mixed with turpentine is then decanted and drawn off from the surface of the water in any convenient manner and the constituents separated in another apparatus.

In order that the process may be clearly understood, I have illustrated the apparatus which I have used to carry the process into effect; but many other forms of apparatus may be designed to accomplish the same purpose.

Referring to the drawing, the figure is a closed tank having a heating-coil 2 within it. The heating-coil is connected to a boiler and return, so as to maintain a suitable temperature in the tank.

3 is a steam-jet.

4 is a vapor-pipe standing over the top of the tank 1 and entering a trap 5.

6 is a pipe connecting trap 5 with a condenser 7, which consists of a coil contained in a tank 8.

9 is a tank to which the lower end of the condenser 7 is attached for receiving the condensed steam.

10 is an air-pump.

11 is a pipe located in the side of the tank 1 near the top and extending downward, through which the resinous materials and other materials mixed with it may be decanted from the tank. Pipe 11 is provided with a valve 12, and 13 is a pipe connecting the trap 5 with the pipe 11, so that any rosins or turpentine coming over into the trap 5 will be condensed and drawn off over the trap into the pipe 11.

14 is a valve in the pipe 13, and 15 is a still adapted for the distillation of the resinous matter decanted from the tank.

16 is a water supply-pipe by means of which the tank may be supplied with water.

I will now describe specifically how the process is carried out in connection with the apparatus illustrated and described in this application.

It is to be understood that while the principles governing the operation of my process are always the same the specific details will have to be varied with different forms of apparatus.

To illustrate one mode of carrying out my process, I will describe the same specifically in connection with the form of apparatus shown in this application.

The tank 1 is filled with chipped wood to up within about a foot of the overflow-pipe 11 and then the tank is filled up with water to the height of the overflow-pipe. Steam is now admitted through the coil 2 and the wood and water are heated up to a temperature of about 160° Fahrenheit and maintained at this temperature for about an hour. This temperature is not high enough to dispel the turpentine which may be dissolved from the wood. After the wood has been steeped in the hot water for about an hour, which is usually sufficient, the air-pump 10 is set working, and the pressure above the water in the tank is reduced. I find that it is necessary to reduce the pressure about twenty inches of mercury, leaving a vacuum of eight to ten inches of mercury. The steam and gas which come over from the tank are either caught in the trap 5 and condensed or they are carried on to the condenser 7 and thence caught in the tank 9. The result of the reduction of pressure above the water in the tank 1 is to cause a sudden expansion of the air and gases contained in the wood. This expansion of gases will cause their expulsion from the pores of the wood and also the expulsion of rosins, oils, and turpentine contained therein, and these rosins, oils, and turpentine when expelled from the wood will rise to the surface of the water, and the specific gravity of the mixture being less than the water will float there. The evaporation from the surface of the water caused by the reduction of air-pressure will reduce the temperature of the water and the floating mass of resinous material. This reduction of temperature will prevent the volatilization of turpentine. The wood being deprived of its air, rosin, and turpentine will sink to the bottom of the tank. Should the resinous material foam too much when it rises to the surface of the water, the foam may be beaten down by a jet of steam through the steam-jet 3 and the resinous material thus prevented from going over into the trap. The air-pump may now be stopped and the pipe 16 opened and the water-level in the tank raised to a point where the resinous material and turpentine floating upon the top of the water may be drawn off by the pipe 11 into a suitable still 15. Thus practically all the resinous material in the wood, as well as the turpentine, may be quickly and economically separated.

Having thus described my invention, what I claim as new, and desire to secure by Letters Patent, is—

1. The process of extracting resinous material from wood, which consists in steeping the wood in liquid, then reducing the atmospheric pressure above the liquid, whereby the resinous matter will be expelled from the wood by the expansion of its contained gases, and then decanting the floating resinous material from the surface of the liquid.

2. The process of extracting resinous material from wood, which consists in steeping wood in hot liquid, then reducing the atmospheric pressure above the surface of the liquid, whereby the contained air and other gases in the wood will be expelled from its pores, together with the resinous material, which mixed together will rise to the surface of the fluid, at the same time the temperature of the mixture will be reduced, preventing the distillation of the resinous material, and then decanting the resinous material from the surface of the fluid, substantially as described.

Signed by me at Baltimore, Maryland, this 5th day of February, 1903.

WILLIAM B. D. PENNIMAN.

Witnesses:
T. BAYARD WILLIAMS,
GEO. WM. SNYDER, Jr.